Nov. 3, 1964     M. KRAMCSAK, JR., ETAL     3,155,357
LEVELING DEVICE
Original Filed May 17, 1961     2 Sheets-Sheet 1
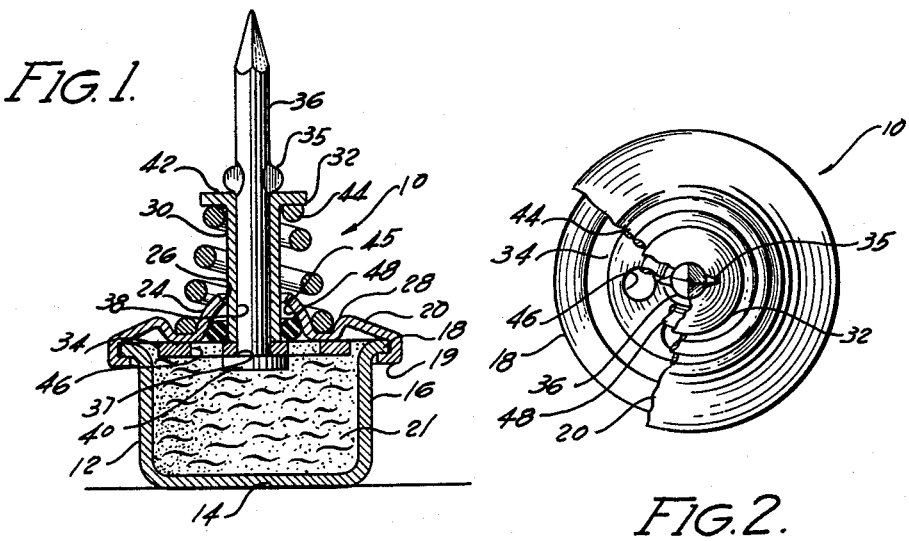
INVENTORS
Michael Kramcsak, Jr.
Robert E. Sheahan
By William J. Newman
Attorney

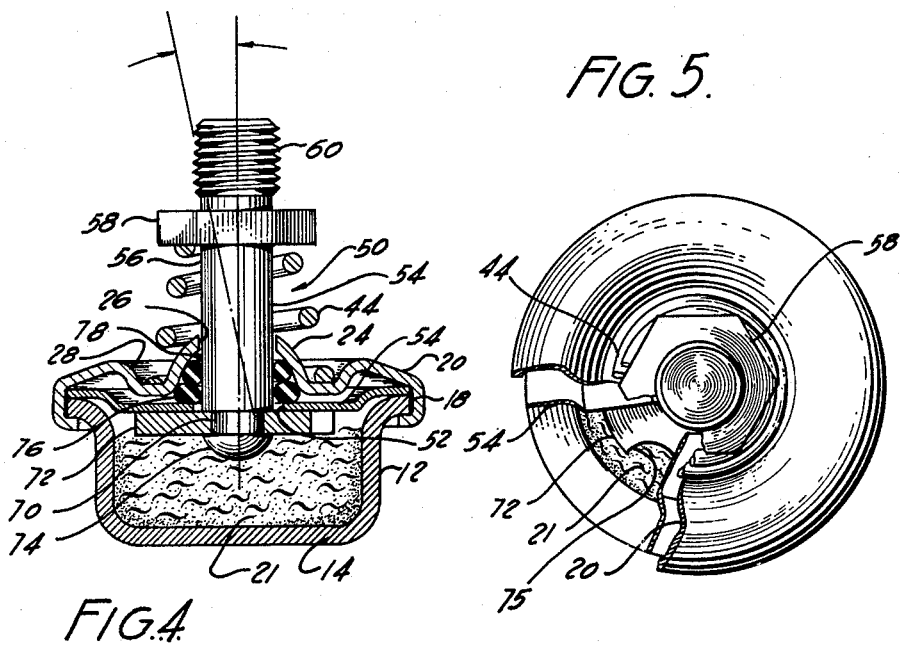
FIG. 5.
FIG. 4.
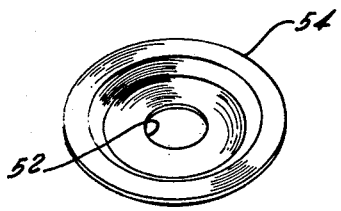
FIG. 7.
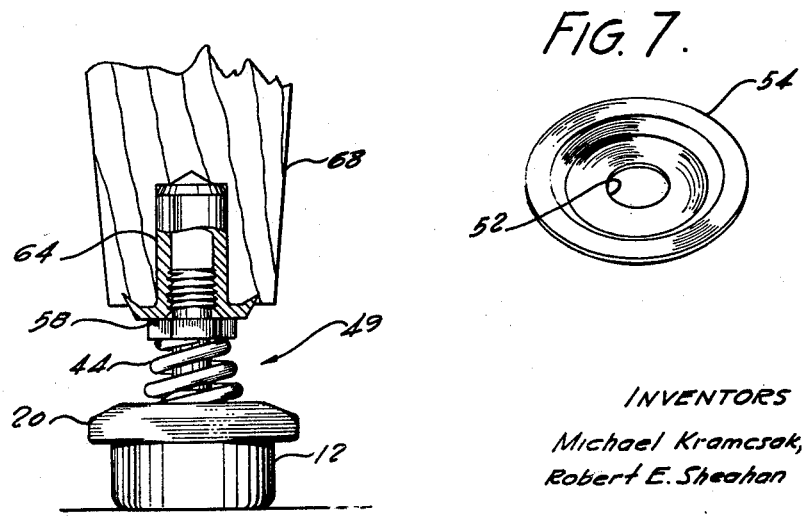
FIG. 6.
INVENTORS
Michael Kramcsak, Jr.
Robert E. Sheahan
By William J. Newman
Attorney.

United States Patent Office 3,155,357
Patented Nov. 3, 1964

3,155,357
LEVELING DEVICE
Michael Kramcsak, Jr., Bridgeport, and Robert E. Sheahan, Woodbridge, Conn., assignors to Stewart-Warner Corporation, Chicago, Ill., a corporation of Virginia
Continuation of application Ser. No. 110,707, May 17, 1961. This application Mar. 27, 1963, Ser. No. 268,435
7 Claims. (Cl. 248—188.3)

This invention relates to leveling devices, and more particularly to devices of the type which are automatically adjustable to prevent furniture, machines, or other articles from rocking or tilting when supported on an uneven floor. This application is a continuation of application Serial No. 110,707, filed May 17, 1961.

There have been employed in the past various types of leveling devices for attachment to the bottom of furniture legs and the like so that all the legs rest firmly on an uneven supporting floor. These devices are in general, either manually or automatically adjustable so that the space separating the bottom of a particular leg above the floor may be occupied. Manual devices are normally adjusted by hand, usually through a screw operation until one or more of the particular legs requiring adjustment are supported on the floor through the adjusting device and carry their respective share of the load. On the other hand, automatic leveling devices usually employ an arrangement containing a spring and, in some cases, a damping medium. One type of leveling device employs the damping medium as a supporting medium and the spring is merely utilized as a means to move one or more of the supporting devices to an original position or toward the original position or weight occupied prior to the application of the weight of the article to be supported. The present invention, however, is directed to a leveling device employing a spring as a support means and a damping medium for the prevention of undesired rocking.

An object of this invention is to provide an automatic leveling device in which the main support means comprises a spring which is located outside of the damping portion of the leveling structure.

Another object of this invention is to provide an improved leveling device in which the rebound of the piston or disc within the casing is timed so that its speed is suitable for the application of forces normally associated with a desk, table or other article of furniture subjected to the levelizing operation.

Another object of this invention is to provide a leveling device that is economical to fabricate and reliable in operation, employing a simple design requiring relatively few internal components and which may be easily fabricated.

It is also an object of this invention to provide a simple but effective sealing arrangement for the damping compound in the leveling device.

Still another object of this invention is to provide a simple automatic leveling device suitable to support an article having tilted legs as well as to support an article having vertical legs.

Other objects of this invention will be pointed out in the following detailed description, in the claims, and illustrated in the accompanying drawings which discloses, by way of examples, the principles of this invention and best modes which have been contemplated for applying these principles.

In the drawings:

FIG. 1 is an elevation view, partially in section, of one embodiment of a leveling device of this invention;

FIG. 2 is a plan view, partially in section, of the leveling device of FIG. 1;

FIG. 3 is an elevational view showing a furniture leg supported by the leveling device of this invention;

FIG. 4 is an elevation view, partly in section of another embodiment of a leveling device of this invention;

FIG. 5 is a plan view, partially in section of the leveling device of FIG. 4;

FIG. 6 is an elevation view of a furniture leg supported by a leveling device of the embodiment shown in FIGS. 4 and 5; and FIG. 7 is an isometric view of the retainer plate used in the leveling device shown in FIGS. 4 through 6.

In general, the embodiments of this invention comprise a cup-like casing having a more or less flat bottom and containing a viscous damping medium. This viscous damping medium will flow as a hydraulic fluid when pressure is applied to it. Thus it is never called on to be a force supporting medium. A cover is rigidly secured to lip portions of the cup-like casing. The cover includes a central bore which is adapted to receive a reciprocating actuator assembly with the bottom end thereof extending into the cup-like casing. The actuator assembly includes a stop located intermediate its end, and a conical spring is positioned between the stop and the cover acting to bias the actuator assembly in a direction away from the cover. A disc or piston is rigidly attached to the end of the actuator assembly within the casing and provides a damping function when the actuator assembly is moved in either direction with the disc immersed in the viscous medium. Since the viscous medium will leak out around the actuator shaft during operation of the levelizer device just as a liquid would, a novel seal arrangement is employed. For the straight up and down levelizer, a free floating O-ring without a retainer arrangement is employed. For the tilting type levelizer, two stacked O-rings are employed to make a flexible seal. Suitable means are provided for coupling the leveling device to the article of furniture with which it is associated.

Referring now to FIG. 1, the improved leveling device 10 comprises a generally cup-like casing 12 which may be stamped from relatively thin sheet metal. The casing 12 is formed so as to have a relatively flattened bottom 14 allowing it to rest securely upon the floor or the like. A side wall 16 of the cup-like casing 10 extends upwardly and terminates in a generally outwardly directed annular flange portion 18. A cover 20, which may also be formed of thin sheet metal, includes an inwardly directed flange 19 at the outer periphery thereof which cooperates with flange 18 and securely engages the same to form an effective seal at this point preventing the egress of a viscous damping medium 21 which is contained within the casing 12. The cover 20 includes a substantially spherical-shaped hub 24 through which is formed a central aperture 26 acting to slidably receive an elongated cylindrical center stem 30. Also it should be pointed out that the shape of the hub in the cover which is used to receive an O-ring may be designed with a shape other than spherical such as conical, as long as it defines a wedge-shaped annular cavity with the stem 30. The cover also has formed therein, an annular recess 28 which is adjacent the conical hub 24.

The center stem 30 has a flange or stop 32 at its exterior end and abuts a disc or piston 34 at its end within the casing 12. An ordinary nail 36 passes through a central aperture 37 in piston 34 and central bore 38 in the stem 30 with its head 40 abutting the piston 34. The nail 36 is eared at the point referenced 35 where it emerges from the flanged end of the stem 30 to fasten the piston, stem and nail in rigid assembly, hereinafter referred to as the actuator assembly 42. The nail 36 is provided for securing the leveling device to the article of furniture. It is to be understood that other means may be provided for fastening the device to furniture, an example being the type used in the embodiment shown in FIGS. 5 through 8 and hereinafter described.

In order to provide sufficient support for the table or other article of furniture making use of the leveling device, there is provided, a conical coil compression spring 44 which is adapted to surround the stem 30 of the actuator assembly. One end of the spring 44 is adapted to rest within the annular recess 28 formed within the cover 20 while the other end of the compression spring 44 is adapted to contact the flange or stop 32. The compression spring 44 therefore tends to bias the actuator assembly 42 in a direction away from the cup-like casing 12. The actuator assembly is prevented from leaving bore 26 by the engagement of the upper surface of the disc 34 with the bottom surface of cover 20. At this time, with the leveling device normally occupying a position such that the nail 36 lies along a vertical axis, the disc 34 will be positioned at the upper surface of the viscous medium 21 within casing 12. The piston or disc 34 forming a rigid part of the actuator assembly interacts with the viscous medium 21 to resist any rapid deflection of the actuator assembly. A plurality of apertures 46 are provided in the disc 34 to facilitate the flow of the viscous medium from the one side of the disc to the other as a load is applied or removed. Further control of the flow of the viscous fluid may be obtained by regulating, by design, the clearance between the periphery of the piston 34 and the inside wall 16 of the casing 12.

The viscous damping medium is a stiff or plastic solid type of material having the properties of a hydraulic fluid. Preferably, it is an uncatalyzed silicone rubber compound of the type manufactured by General Electric Company under their code SE–100U and described in detail in U.S. Patent No. 2,744,878. This compound comprises a molecular weight polydimethyl siloxane which is substantially free of trifunctional units, and a calcium carbonate filler. This material is especially adaptable for use as the viscous medium because it is plastic and flows as a fluid when pressure is applied to it. The material is unusually chemically inert, water resistant, thermally stable over a wide range, noncorrosive in contact with common metals, nontoxic, nonflammable and self-extinguishing. The uncatalyzed material is desirable, also, because it will not harden after a period of time to cause failure of the device during its life.

Since the material does flow as a fluid, provisions must be made in the leveling device 10 to prevent leakage of the viscous medium 21 through the interstice between the actuator assembly 42 and the cover 20. The hub 24 forms a substantially conical recess 45 within which is disposed an O-ring 48 surrounding the stem 30 of the actuator assembly 42. As shown in FIG. 1 the apertures 46 in the disc 34 are so positioned that the O-ring 48 covers at least a portion of the apertures. Thus, the O-ring will be wedged between the stem 30 and the cover 20 within the recess 45 regardless of the direction in which the actuator assembly 42 is moved. That is, when the assembly is moving upward, it will naturally force a portion of the damping medium 21 upward by the action of the upper surface of the disc 34 to wedge the O-ring in engagement with the stem and the cover. When the actuator assembly is moved downward a portion of the medium 21 will be forced upward through the apertures 46 in the disc 34 which will act to push the O-ring upward. Thus, a freely floating O-ring is caused to seal a piston shaft opening without securing the O-ring in place with a retainer plate or a fixed groove as is normally done. It has been found in testing this device that this sealing arrangement effectively prevents the leakage of any of the viscous medium 21 from the device.

The device is constructed so that most of the resistance to movement of the actuator assembly will be provided by the conical coil spring 44. However, when a load is initially applied to the leveling device there will be a resistance to movement of the actuator assembly 42 by the viscous damping medium 21 which is initially below the piston 34. As the actuator assembly 42 moves downwardly carrying piston 34 through the viscous damping medium 21 the damping fluid will flow upwardly between the piston 34 and the side wall 16 and through apertures 46 until an equilibrium position is reached. Thus the viscous damping medium 21 resists the application of sudden forces so that the actuator assembly of the leveler has a relatively slow response.

In the particular construction shown the physical parameters are chosen such that the rebound of the piston or disc will be at a speed that is suitable for the application of the leveling device to the articles of furniture such as chairs, desks, tables and the like. The spring has an increasing gradient of force from weak to strong due to its conical shape to automatically adjust itself for proper action regardless of the magnitude of the applied load. For example, in one model of the leveling device, the spring is preloaded with a force of approximately 5½ lbs. and this load force is increased to approximately 18 lbs. when the device is fully deflected, further deflection being stopped by the piston striking the inside bottom surface of the casing 12. If used with an article of furniture having four legs, the device will operate correctly if the total weight of the article is between approximately 35 and 100 pounds.

The operation of the leveling device is materially improved by providing the conical spring support means as a completely independent unit mounted exteriorly of the casing 12 containing the viscous damping medium 21, since the spring operation is unobstructed by the damping medium as would be the case if the spring were mounted within the casing. In addition, with the presently improved structure, the force of the conical compression spring acts to hold the cover and cup-like case in engagement rather than tending to disengage these elements as in prior art structures. A tighter seal is, therefore, effected between the casing 12 and the cover 20 with the spring so arranged. Also this construction during manufacture allows easy substitution of springs of different sizes and strengths for applications involving widely different weights or articles to be supported.

The operation of the improved leveling device 10 may be understood by reference to FIG. 1 which shows the device in its fully extended position. Assuming that the device is positioned on a suitable piece of furniture, any downwardly directed force transmitted to the furniture leg is effectively directed to the actuator assembly 42. This downward applied force is opposed by the conical compression spring 44 which presses with its upper end against the flange 32 of the actuator assembly. The result is that the spring is compressed while the actuator rod is moved downwardly through the cover 20 and at the same time pushes the disc or piston 34 through the damping medium 21. The movement of the actuator rod is resisted by the damping fluid which will slowly move upward between the disc 34 and the inner surface of the cylindrical wall 16 as well as through the apertures 46 in the disc. This resistance is only momentary until fluid equilibrium occurs wherein all of the force is taken up by the conical spring and the disc 34 has moved downwardly within the viscous damping fluid 21 to a position determined only by the spring constant of conical coil spring 44 and the force which is directed against this coil spring. In this explanation the friction of the O-ring seal which always opposes the force that causes motion has been neglected because it is a minor force. It is apparent therefore that the medium, because of its internal viscous fluid friction, acts only to resist sudden forces applied to the actuator rod and provides for an adjusting action which has a relatively slow response upon subsequent removal of the load from the leveling device, the compression spring 44 tending to force the actuator rod and piston disc upwardly through this medium. Again, the momentary resistance that is offered by the viscous damping fluid against the moving disc 34 results in a relatively slow response in the removal of the force. However, the viscous damping fluid soon adjusts itself depending upon the new position of the disc 34 and the forces upon the damping medium are once more in equilibrium. It can be readily seen that there is no interference of the damping action by the compression spring 44.

For a description of a second embodiment of the invention reference is made to FIGS. 4 through 7 of the drawings. This embodiment also comprises a flat bottomed cup-like casing 12 and a cover member 20 in sealed relation thereto to prevent the egress of a viscous damping medium 21 contained within the casing 12. The cover 20 also includes a substantially conical shaped hub 24 through which is formed a central aperture or bore 26. An actuator assembly 50 is slidably disposed within the bore 26 and extends through an enlarged aperture 52 in a retainer plate 54 secured within the casing between the cover 20 and the outwardly directed annular flange portion 18 of the casing 12.

The actuator assembly 50 comprises an actuator rod 55 which is adapted to slide within the bores 26 and 52 respectively along the full length of its intermediate portion 56. Adjacent the intermediate portion 56 there is a hexagonal shoulder or stop 58, and the actuator rod terminates at its outer end with a threaded portion 60 which engages an internally threaded fitting 64 secured into a leg 68 of the furniture or other article (FIG. 6). The other end of rod 55 terminates with a reduced cross-section tip portion 70, this tip portion being adapted to receive a disc or piston 72. As indicated in FIG. 4, the disc 72 is rigidly attached to the actuator rod 55 by having the tip portion peened, staked or riveted, as at 74. This arrangement is only indicative of one manner in which the actuator assembly may be constructed, and it is to be understood that it is, in no means, limited to this type of arrangement. For example, the assembly including a nail such as shown in the first embodiment of FIGS. 1 through 3 is also readily adaptable for use with this embodiment.

To support the furniture or other article making use of the leveling device there is provided a conical coil compression spring 44 which surrounds the rod 55 at its intermediate portion 56 with its one end engaging the stop 58 and the other end engaging the annular recess 28 formed within the cover 20.

As seen in FIG. 5 the piston or disc 72 is substantially smaller in diameter than the inside of the casing 12. Also the bore 26 in the cover 20 is somewhat larger than the intermediate portion 56 of the actuator rod 55 so that the actuator assembly 50 may be readily tilted with respect to the casing and cover. The bore 52 in the retainer plate 54 is also substantially larger than the actuator rod 55 to accommodate the tilting action of the assembly. With the reduced diameter piston or disc it was found incompatible, with the strength required, to pierce the disc with a set of apertures large enough to allow the viscous damping fluid to flow in a short enough time to meet the requirements for quick leveling and tilting action. Therefore three semi-circular scallops 75 are removed from the periphery of the disc to speed up the action satisfactorily.

It was further found that the O-ring sealing scheme used in the embodiment of FIGS. 1 through 3 would not function satisfactorily enough for the tiltable leveling device. Therefore, a pair of O-rings 76 engage the periphery of the actuator rod 55 within the substantially conical recess 78 formed by the inside surface of the hub 24 on the cover 20. The O-rings are maintained within the recess 78 by the retainer plate 54 and always keep them under a slight degree of compression.

It has been found that a tilt angle of at least 12° may be provided by the arrangement as herein disclosed with no appreciable leakage of the viscous damping medium 21 through the aperture 26 in the cover 20. This of course makes the device especially suitable for use with tables or other articles of furniture having non-vertical legs, but it is to be understood that they were also readily usable with vertically orientated legs.

It should be understood that the above described structures are merely illustrative of the principles of this invention and that numerous modifications may be devised by those skilled in the art without departing from the scope of the invention. Therefore, it is intended that this invention be limited only by the scope of the appended claims.

What is claimed is:

1. A leveling device for supporting a load comprising: an actuator assembly, a cup-like casing defining a chamber, a cover disposed across said cup-like casing, said cover including a central bore for receiving said actuator assembly and allowing reciprocation therein, a disc-like member secured to and forming a part of said actuator assembly within said chamber, said disc-like member spaced slightly from the inner surface of said casing, a conical coil spring positioned coaxial of said assembly outside of said cover, with one end of said spring constrained against said actuator assembly and the other end of said conical coil spring in contact with the outer surface of said cover, said spring having a maximum spring force at least equal to the load thereon, and a viscous damping medium within said cup-like casing whereby movement of said assembly towards said cup-like casing is resisted by said spring and said viscous medium and movement away from said cup-like casing is resisted by said viscous medium only.

2. A leveling device for supporting a load comprising: a cup-like casing having a circular upper opening, a transversely extending cover for said casing, a centrally located flange portion on said cover forming a bore, an actuator assembly positioned within said bore for reciprocation within said cup-like casing, said actuator assembly including stop means formed along said rod at a point remote from the end of said assembly within said cup-like housing, a conical coil spring positioned between said stop means and said cover for biasing said actuator assembly in a direction away from said cup-like housing and having a maximum spring force at least equal to the load thereon, a disc-like member secured to and forming a part of said actuator rod within said cup-like housing, said disc-like member having a diameter slightly less than the internal diameter of said cup-like housing, and a viscous medium substantially filling said cup-like housing, said viscous medium comprising an uncatalysed compound of high molecular weight polydimethyl siloxane and calcium carbonate filler.

3. A leveling device comprising: a cup-like casing having a flat bottom, a cover fixed to the casing in sealed relation thereto, said cover having a recess formed by its inner surface centrally thereof and a bore extending therethrough from the bottom of said recess, an actuator assembly positioned within said bore for reciprocation therein, the inner surface of said cover in said recess and said actuator assembly defining a wedge-shaped cavity, stop means positioned on said assembly at a point exterior of said cover, a spring positioned between said cover and said stop means tending to bias said actuator assembly away from said cup-like casing to an extended position, a piston forming a part of said actuator assembly within said cup-like casing and having at least one or more passages therethrough, a viscous fluid substantially filling said cup-like casing, an O-ring surrounding said assembly within said wedge-shaped cavity, said one or more passages in said piston disposed so that said O-ring covers at least a portion thereof when said assembly is in its extended position.

4. A leveling device comprising: an actuator assembly, a cup-like casing defining a chamber, a cover disposed across said cup-like casing, said cover having a substantially spherically-shaped outwardly protruding hub having a central bore for receiving said actuator assembly and allowing reciprocation therein, a disc-like member forming a part of said actuator assembly within said chamber, said disc-like member spaced slightly from the inner surface of said casing and having at least one aperture therethrough, an O-ring disposed about said assembly between said disc-like member and said cover within a spherically-shaped recess formed by said spherical hub, a conical coil spring positioned coaxial of said assembly outside of said cover with one end of said spring in contact with said actuator assembly and the other end of said coil spring being in contact with the outer surface of said cover to bias said assembly away from said cover, said apertures in the disc-like member being positioned so that said O-ring covers at least a portion of said apertures when said assembly is in its extended position, and a viscous damping medium within said cup-like casing whereby movement of said assembly toward said cup-like casing is resisted by said spring and said viscous medium and movement away from said cup-like casing is resisted by said viscous medium only.

5. A leveling device comprising: a cup-like casing having a flat bottom, a cover fixed to the casing in sealed relation thereto, said cover having a substantially conical recess formed centrally thereof by its inner surface centrally thereof and having a bore extending therethrough from the bottom of said recess, a retainer plate secured between said cover and said casing and having a bore therethrough in axial alignment with the bore in said cover, an actuator assembly positioned within said bores for reciprocation therein, stop means on said assembly at a point exterior of said cover, a conical spring positioned between said cover and said stop means tending to bias said assembly away from said cup-like casing, a piston forming a part of said actuator assembly within said casing between said bottom and said retainer plate and having an outer diameter substantially smaller than the inner diameter of said casing, a viscous fluid substantially filling said cup-like casing between said bottom and said retainer plate, and a pair of O-rings surrounding and engaging said assembly within said recess and restrained therein by said retainer plate.

6. A leveling device comprising: a cup-like casing having a flat bottom, a cover fixed to the casing in sealed relation thereto and having a bore extending centrally therethrough, a retainer plate secured within said casing and having a bore therethrough in axial alignment with the bore in said cover, an actuator assembly positioned within said bores for reciprocation therein, stop means on said assembly at a point exterior of said cover, a conical spring positioned between said cover and said stop means tending to bias said assembly away from said cup-like casing, a piston forming a part of said actuator assembly within said casing between said bottom and said retainer plate, at least one O-ring surrounding and engaging said actuator assembly between said cover and said retainer plate, a viscous fluid substantially filling said cup-like casing between said bottom and said retainer plate, and means allowing said viscous fluid to flow to either side of said piston upon movement of said actuator assembly.

7. In a combination with an article of furniture having four or more legs, a leveling device attached to the bottom of each leg comprising: a cup-like casing having a flat bottom, a cover fixed to the casing in sealed relation thereto, said cover including a bore formed centrally thereof, an actuator assembly positioned within said bore for reciprocation therein, stop means positioned on said assembly at a point exterior of said cover, a conical spring positioned between said cover and said stop means, said spring tending to bias said actuator assembly away from said cup-like casing and having a spring force when completely depressed at least equal to the proportionate load on its attached leg, piston means secured to and forming a part of said actuator assembly within said cup-like casing, a viscous fluid substantially filling said cup-like casing and means for allowing said viscous fluid to move to either side of said piston means in response to movement of said actuator assembly.

References Cited in the file of this patent
UNITED STATES PATENTS

| | | |
|---|---|---|
| 2,836,843 | Gallagher | June 3, 1958 |
| 2,871,616 | Sundell | Feb. 3, 1959 |
| 3,045,390 | Tao | July 24, 1962 |